United States Patent
Noh

(10) Patent No.: US 10,938,041 B2
(45) Date of Patent: Mar. 2, 2021

(54) AIR CONDITIONER AND FUEL CELL SYSTEM INCLUDING SAME

(71) Applicants: Hyundai Motor Company, Seoul (KR); Kia Motors Corporation, Seoul (KR)

(72) Inventor: Yong Gyu Noh, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 353 days.

(21) Appl. No.: 15/801,752

(22) Filed: Nov. 2, 2017

(65) Prior Publication Data

US 2018/0159151 A1 Jun. 7, 2018

(30) Foreign Application Priority Data

Dec. 2, 2016 (KR) .................. 10-2016-0163729

(51) Int. Cl.

| | |
|---|---|
| *H01M 8/04007* | (2016.01) |
| *H01M 8/04014* | (2016.01) |
| *H01M 8/04029* | (2016.01) |
| *H01M 8/04111* | (2016.01) |
| *H01M 8/04119* | (2016.01) |
| *H01M 8/04089* | (2016.01) |
| *B60H 1/00* | (2006.01) |

(Continued)

(52) U.S. Cl.
CPC .... *H01M 8/04074* (2013.01); *B60H 1/00278* (2013.01); *B60H 1/00564* (2013.01); *H01M 8/04014* (2013.01); *H01M 8/04029* (2013.01); *H01M 8/04089* (2013.01); *H01M 8/04111* (2013.01); *H01M 8/04126* (2013.01); *H01M 8/04141* (2013.01); *H01M 8/04753* (2013.01); *H01M 2008/1095* (2013.01); *H01M 2250/20* (2013.01)

(58) Field of Classification Search
CPC ........................................... H01M 8/04–04149
See application file for complete search history.

(56) References Cited

U.S. PATENT DOCUMENTS

| | | | | |
|---|---|---|---|---|
| 1,966,275 A | * | 7/1934 | Wright | F24F 5/0035 62/121 |
| 4,002,040 A | * | 1/1977 | Munters | F28F 13/185 62/121 |
| 5,206,094 A | | 4/1993 | Katz | |

(Continued)

FOREIGN PATENT DOCUMENTS

| | | |
|---|---|---|
| KR | 101461874 B1 | 11/2014 |
| KR | 101673769 B1 | 11/2016 |

*Primary Examiner* — Jonathan Crepeau
*Assistant Examiner* — Jacob Buchanan
(74) *Attorney, Agent, or Firm* — Slater Matsil, LLP

(57) ABSTRACT

An air conditioner includes a body including an air inlet configured to receive air from an air compressor configured to press and transfer the air to provide the air to a cathode of a fuel cell stack. An air element is configured to supply the air to the cathode, and an inner space allows the air inlet and the air outlet to communicate with each other. A plurality of tubes is provided in the inner space of the body and through which fluid flows along hollows holes of the tubes. While the air supplied through the air inlet passes through the inner space, the air is cooled through heat exchange with the fluid flowing along the hollows of the tubes.

20 Claims, 4 Drawing Sheets

(51) Int. Cl.
   *H01M 8/04746*   (2016.01)
   *H01M 8/1018*   (2016.01)

(56) References Cited

U.S. PATENT DOCUMENTS

| | | | | |
|---|---|---|---|---|
| 5,432,020 | A * | 7/1995 | Fleck | H01M 8/04089 |
| | | | | 429/413 |
| 6,309,774 | B1 * | 10/2001 | Buchner | H01M 8/04029 |
| | | | | 429/437 |
| 6,468,681 | B1 * | 10/2002 | Horiguchi | H01M 8/04119 |
| | | | | 429/437 |
| 2002/0157417 | A1 * | 10/2002 | Iritani | F25B 39/02 |
| | | | | 62/515 |
| 2003/0190513 | A1 | 10/2003 | Meissner et al. | |
| 2005/0110172 | A1 * | 5/2005 | Tanaka | B01D 63/02 |
| | | | | 261/104 |
| 2006/0054312 | A1 * | 3/2006 | Kim | F28D 1/05391 |
| | | | | 165/146 |
| 2007/0074866 | A1 * | 4/2007 | Bhatti | H05K 7/20836 |
| | | | | 165/248 |
| 2008/0079180 | A1 * | 4/2008 | Kim | H01M 8/04141 |
| | | | | 261/104 |
| 2009/0100854 | A1 * | 4/2009 | Reyzin | F25B 39/04 |
| | | | | 62/305 |
| 2010/0239927 | A1 * | 9/2010 | Moran | H01M 8/04097 |
| | | | | 429/429 |
| 2014/0157819 | A1 * | 6/2014 | Koo | H01M 8/04059 |
| | | | | 62/498 |
| 2014/0193726 | A1 | 7/2014 | Noh et al. | |

* cited by examiner

US 10,938,041 B2

AIR CONDITIONER AND FUEL CELL SYSTEM INCLUDING SAME

CROSS-REFERENCE TO RELATED APPLICATIONS

This application is based on and claims priority to Korean Patent Application No. 10-2016-0163729, filed on Dec. 2, 2016, which application is hereby incorporated herein by reference.

TECHNICAL FIELD

The present disclosure relates to an air conditioner and a fuel cell system including the same.

BACKGROUND

A fuel cell is a device configured to convert chemical energy stored in hydrocarbon or a hydrogen fuel into electrical energy through an electrochemical reaction with air. A polymer electrolyte fuel cell (PEFC) used in a vehicle and the like is a fuel cell using polymer as an electrolyte and is operated at a temperature of 100° C. or less. Hydrogen ions produced in an anode of a fuel cell stack move to a cathode through the electrolyte and react with oxygen in the cathode to generate electricity while generating water.

In the fuel cell system, the hydrogen ions are moved using a polymer membrane as an electrolyte. To achieve this, the polymer electrolyte membrane should contain moderate moisture. Thus, in the conventional art, a humidifier configured to eject water to air supplied to the cathode of the fuel cell stack was used.

Further, the polymer electrolyte fuel cell is operated at the temperature of 100° C. or less, and thus, when the temperature of the air supplied to the cathode through an air compressor exceeds 100° C., the air needs to be cooled. In the conventional art, an air cooler is arranged to cool the air.

However, in an interior of the vehicle, a space for installing the fuel cell is small, and thus, additional installation of separate devices such as the air cooler and the humidifier may be restrained. Thus, a device that may supply cooled and humidified air while supplying air having high pressure through an air compressor and a fuel cell system including the same are required.

SUMMARY

An aspect of the present disclosure provides a device that may cool air having high temperature and high pressure, which is discharged from an outlet of an air compressor, to supply the cooled air to a cathode, and a fuel cell system including the same.

Another aspect of the present disclosure provides a device that may provide humidified air to a cathode of a fuel cell stack and a fuel cell system including the same.

In an embodiment, an air conditioner may include a body including an air inlet configured to receive air from an air compressor configured to pump the air to provide the air to a cathode of a fuel cell stack. An air outlet is configured to supply the air to the cathode, and an inner space allowing the air inlet and the air outlet to communicate with each other. A plurality of tubes is provided in the inner space of the body and through which fluid flows along hollows holes of the tubes. While the air supplied through the air inlet passes through the inner space, the air is cooled through heat exchange with the fluid flowing along the hollows of the tubes.

In another embodiment, the body may include an inlet manifold formed on a side of the body, from which the fluid is supplied to the tubes, communicating with the tubes to branch the fluid into the tubes, and providing a space distinguished from the inner space. An outlet manifold is formed on a side of the body, to which the fluid is discharged from the tubes, communicating with the tubes to accommodate the fluid discharged from the tubes, and providing a space distinguished from the inner space.

In yet another embodiment, the air conditioner may include a two-fluid nozzle provided on one side of the inlet manifold and configured to eject compressed air and water to the space of the inlet manifold by supplying the compressed air, and the compressed air and the water are mixed with each other by the two-fluid nozzle or in the space of the inlet manifold, to form the fluid.

In yet another embodiment, the body may further include a fluid outlet through which the fluid ejected from the two-fluid nozzle is supplied to an inlet of the air compressor and which is formed in the outlet manifold to communicate with the inlet of the air compressor, so as to humidify the air that is to be supplied to the air inlet of the body.

In yet another embodiment, the two-fluid nozzle may be provided on one side of the inlet manifold to be adjacent to the air outlet, and may eject the fluid in a direction that is opposite to a direction in which the air supplied through the air inlet passes through the inner space.

In yet another embodiment, the air conditioner may further include a plurality of micro holes which are formed in the tubes to communicate with the hollows and through which not water but the air passes, and a portion of the air passing through the inner space of the body is introduced into the hollows of the tubes through the micro holes to heat the fluid within the hollows to evaporate water in the fluid.

In yet another embodiment, the number of the micro holes formed in tubes arranged to be adjacent to the air inlet may be larger than the number of micro holes formed in tubes arranged to be adjacent to the air outlet.

In yet another embodiment, the body may further include a fluid outlet formed in the outlet manifold to communicate with an inlet of the air compressor, and an inner volume of the outlet manifold increases as it goes to the fluid outlet.

In yet another embodiment, the air conditioner may further include a plurality of separators provided in the inner space to be close to the air inlet, and configured to disperse the air supplied from the air compressor.

In yet another embodiment, a fuel cell system may include a fuel cell stack having an anode and a cathode, an air compressor configured to pump air to supply the air to the cathode, and an air conditioner configured to receive the air from an outlet of the air compressor to supply the air to the cathode, the air conditioner includes a body having an inner space through which the air supplied from the outlet of the air compressor passes, and a plurality of tubes which are provided in the inner space of the body and through which fluid flows along hollows inside the tubes, and while passing through the inner space, the air supplied from the outlet of the air compressor to the air conditioner is cooled through heat exchange with the fluid flowing along the hollows of the tubes.

In yet another embodiment, the body may include an inlet manifold formed on a side of the body, from which the fluid is supplied to the tubes, and providing a space communicating with the tubes to branch the fluid into the tubes, and an outlet manifold formed on a side of the body, to which the fluid is discharged from the tubes, and providing a space communicating with the tubes to accommodate the fluid discharged from the tubes.

In yet another embodiment, the fuel cell system may further include a two-fluid nozzle provided on one side of the inlet manifold and configured to suction water from a storage tank in which the water is stored, by supplying the air bypassed from the outlet of the air compressor, and eject the air and the water to the space of the inlet manifold, and the fluid formed by mixing the air and the water ejected from the two-fluid nozzle with each other in the space of the inlet manifold may sequentially pass through the inlet manifold, the tubes and the outlet manifold.

In yet another embodiment, the fuel cell system may further include a two-fluid nozzle provided on one side of the inlet manifold and configured to eject, to the space of the inlet manifold, the fluid formed by mixing the air bypassed from the outlet of the air compressor and water suctioned from a storage tank in which the water is stored with each other in an interior thereof, and the fluid ejected from the two-fluid nozzle may sequentially pass through the inlet manifold, the tubes and the outlet manifold.

In yet another embodiment, further the fuel cell system may further include a recovery pipe through which the fluid ejected from the two-fluid nozzle is supplied to the inlet of the air compressor via the inlet manifold, the tubes and the outlet manifold, and which is connected from the outlet manifold to the inlet of the air compressor to humidify the air that is to be supplied to the cathode.

In yet another embodiment, the fuel cell system may further include an operation valve provided in the recovery pipe to open/close the recovery pipe, and configured to determine an operation of the two-fluid nozzle according to the opening/closing the recovery pipe.

In yet another embodiment, the fuel cell system may further include a suction pipe connected from storage tank to the two-fluid nozzle such that the water is suctioned from the storage tank to the two-fluid nozzle, and the storage tank recovers and stores water in exhaust gas discharged from the cathode.

In yet another embodiment, the fuel cell system may further include a check valve provided in the suction pipe to prevent the water from flowing from the two-fluid nozzle to the storage tank when the recovery pipe is closed by the operation valve.

In yet another embodiment, the fuel cell system may further include a control unit configured to control the operation valve, and the control unit opens the operation valve to cool the air by the air conditioner, when the temperature of the air at the outlet of the air compressor is not less than a first reference temperature or the temperature of the air supplied to the cathode is not less than a second reference temperature.

In yet another embodiment, the control unit may calculate a required cooling rate of the air supplied to the cathode based on a difference between the temperature of the air at the outlet of the air compressor and the temperature of the air supplied to the cathode and a flow rate of the air supplied to the air compressor, and may control an opening time period of the operation valve based on the calculated required cooling rate.

In yet another embodiment, the control unit may open the operation valve when an operation condition of the air compressor corresponds to a condition in which a surge phenomenon occurs, in a relationship between a flow rate of the air introduced into the inlet of the air compressor and an outlet pressure of the air compressor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
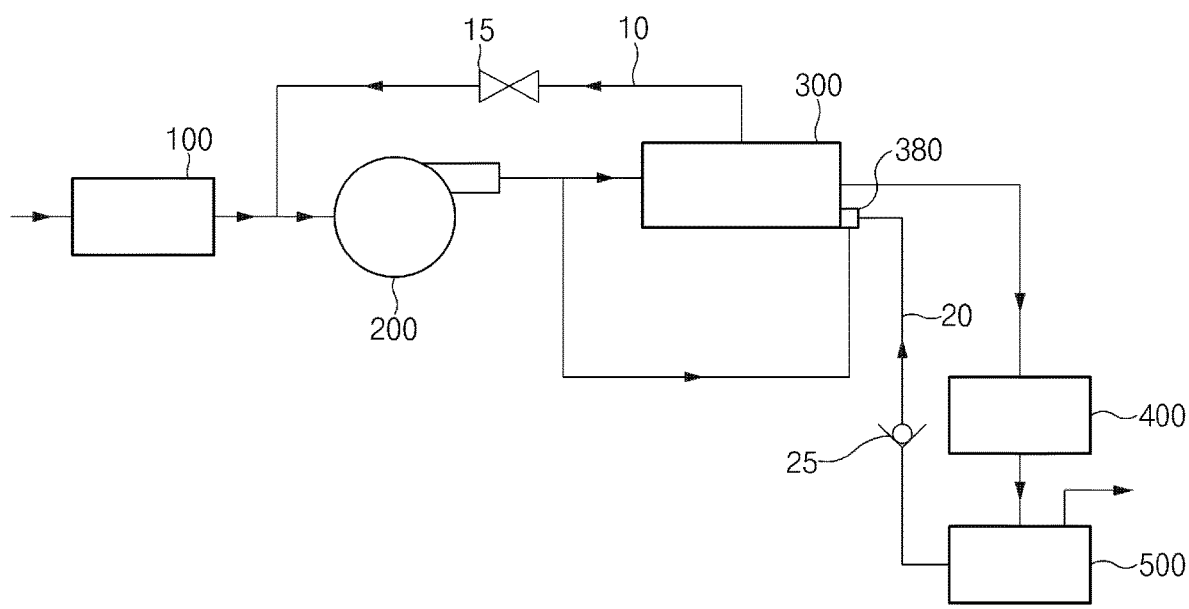
FIG. 1 is a diagram illustrating a fuel cell system according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in the description of embodiments of the present disclosure, when it is determined that the detailed descriptions of well-known configurations or functions disturb understanding of the embodiments of the present disclosure, the detailed descriptions will be omitted.

Figure 2:
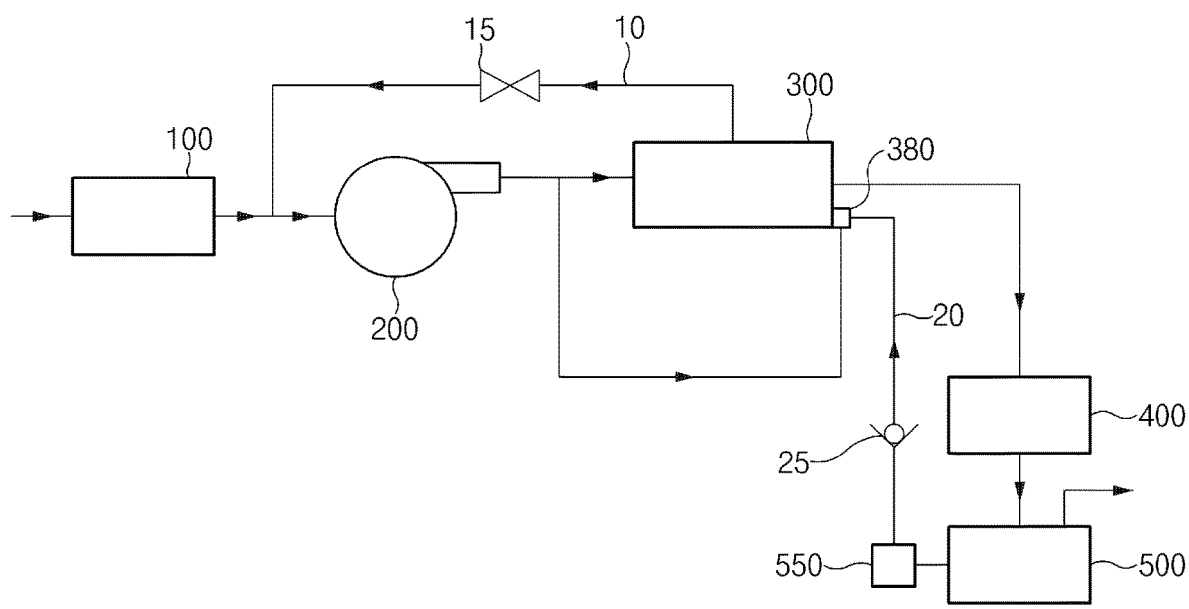
FIG. 2 is a diagram illustrating a fuel cell system according to a second embodiment of the present disclosure.
Figure 3:
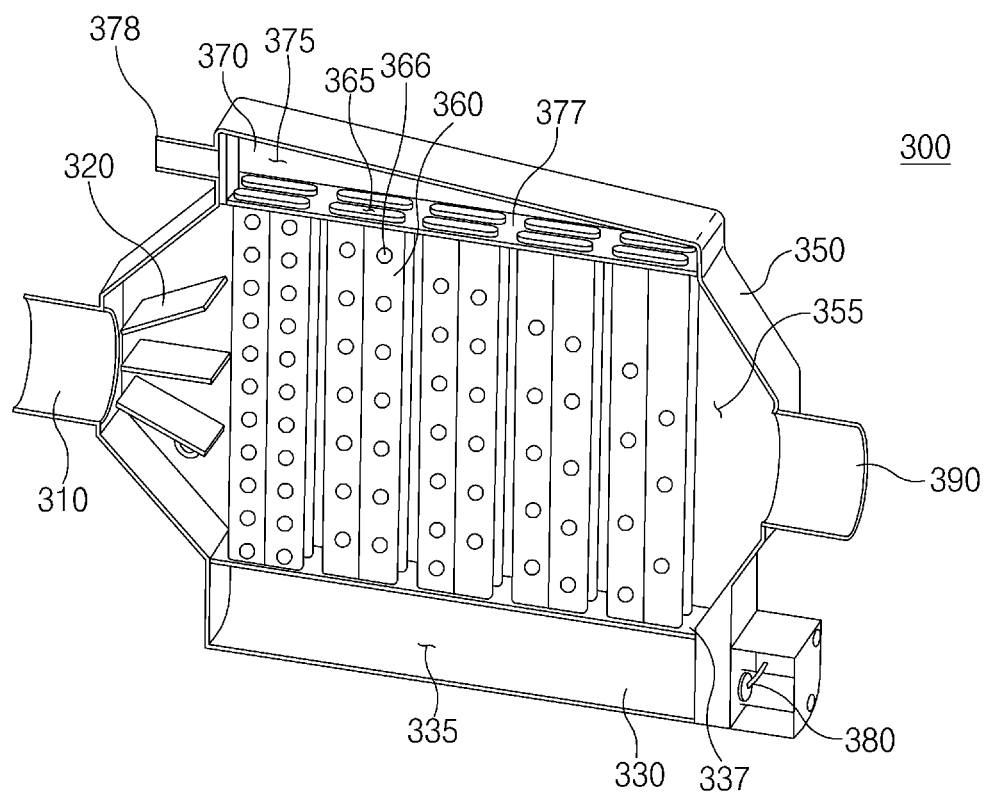
FIG. 3 is a perspective view illustrating an interior of an air conditioner according to the embodiment of the present disclosure.

FIG. 1 is a diagram illustrating a fuel cell system according to an embodiment of the present disclosure. FIG. 2 is a diagram illustrating a fuel cell system according to a second embodiment of the present disclosure. FIG. 3 is a perspective view illustrating an interior of an air conditioner according to the embodiment of the present disclosure. Hereinafter, the fuel cell system according to the embodiment of the present disclosure will be described with reference to FIGS. 1 to 3.

A fuel cell system according to the embodiment of the present disclosure includes a filter 100, an air compressor 200, an air conditioner 300 and a stack 400.

The stack 400 includes an anode (not illustrated) and a cathode (not illustrated). Modified hydrogen is supplied to the anode, air (oxygen) is supplied to the cathode, and electricity is generated by reaction between the hydrogen and the oxygen, which occurs in the stack 400.

The air compressor 200 pumps the air to supply the air to the cathode. Air supplied from the outside to an inlet of the air compressor 200 may be pressed by the air compressor 200 and may be supplied to the cathode of the stack 400.

The filter 100 is provided at a front end of the inlet of the air compressor 200 to remove foreign substances included in the air introduced into the inlet of the air compressor 200.

The air conditioner 300 is provided between the air compressor 200 and the stack 400 to receive the air from an outlet of the air compressor 200 to supply the air to the cathode. The air passing through the air conditioner 300 is cooled and humidified to be supplied to the cathode.

Hereinafter, the air conditioner 300 will be described in more detail with reference to FIG. 3.

The air conditioner 300 includes an air inlet 310, an air outlet 390, a body 350 and a plurality of tubes 360.

The air inlet 310 receives the air from the air compressor 200, and the air outlet 390 supplies the air to the cathode. The body 350 has an inner space allowing the air inlet 310 and the air outlet 390 to communicate with each other. That is, the air supplied from the air compressor 200 through the air inlet 310 passes through the inner space 355 of the body 350 and is supplied to the cathode through the air outlet 390.

The plurality of tubes 360 are provided in the inner space 355 of the body 350. As illustrated in FIG. 3, the plurality of tubes 360 may be arranged from the air inlet 310 toward the air outlet 390 side by side. Further, the plurality of tubes 360 may be dually arranged to increase an area in which the air passing through the inner space 355 and surfaces of the tubes 360 are in contact with each other.

Hollows 365 are formed inside the plurality of tubes 360, and fluid flows along the internal hollows 365. The air supplied from the outlet of the air compressor 200 to the air conditioner 300 is cooled through heat exchange with the fluid flowing along the hollows 365 of the tubes 365 while the air passes through the inner space 355. The air cooled through the heat exchange with the fluid is supplied to the cathode, so that the fuel cell system may be operated at a proper temperature (100° C. or less).

The air conditioner 300 may further include a plurality of separators 320. The separators 320 may be provided in the inner space 355 to be close to the air inlet 310, and may disperse the air supplied from the air compressor 200. The separators 320 disperse the air supplied from the air compressor 200, and thus the air passing through the inner space 355 of the body 350 and the fluid passing through the plurality of tubes 360 are in contact with each other in a larger area, so that heat exchange efficiency may be improved.

The body 350 may include an inlet manifold 330 and an outlet manifold 370. The inlet manifold 330 may be formed on a side of the body 350, from which the fluid is supplied to the plurality of tubes 360, to provide a space 335 distinguished from the inner space 335 of the body 350. Further, the inlet manifold 330 may communicate with the plurality of tubes 360 to branch the fluid into the plurality of tubes 360. The outlet manifold 370 may be formed on a side of the body 350, to which the fluid is discharged from the plurality of tubes 360. The outlet manifold 370 may communicate with the tubes 360 to accommodate the fluid discharged from the tubes 360 and provide a space 375 distinguished from the inner space 355.

Meanwhile, the plurality of tubes 360 may be coupled to fixing plates 337 and 377 provided at a boundary between the inner space 355 of the body 350 and the inlet manifold 330 and a boundary between the inner space 355 of the body 350 and the outlet manifold 370 and may thus be fixed to the inner space 355.

The air conditioner 300 may further include a two-fluid nozzle 380 provided on one side of the inlet manifold 330 to eject air and water to the inlet manifold 330. The two-fluid nozzle 380 may be classified into an external mixing two-fluid nozzle and an internal mixing two-fluid nozzle according to where air and water are mixed with each other. FIG. 1 illustrates a fuel cell system using an external mixing two-fluid nozzle.

The two-fluid nozzle 380 may suction water by supplying compressed air to eject the air and the water together. In more detail, when the compressed air is supplied to the two-fluid nozzle 380 and is ejected from the two-fluid nozzle 380, a pressure drop may occur inside the two-fluid nozzle 380 in a moment. When the pressure outside the two-fluid nozzle 380 becomes larger than the pressure inside the two-fluid nozzle 380 due to the pressure drop, external water may be suctioned into the two-fluid nozzle 380 and may be ejected to the inlet manifold 330 together with air. In this case, air bypassed from an outlet of the air compressor 200 may be used as the compressed air, and water may be suctioned from a storage tank 500 in which water is stored. The water stored in the storage tank 500 may be water that is stored after water in exhaust gas discharged from the cathode is collected. That is, the exhaust gas discharged from the cathode is exhausted via the storage tank 500, and the water in the exhaust gas may be collected and stored in the storage tank 500.

FIG. 2 illustrates a fuel cell system using an internal mixing two-fluid nozzle. The fuel cell system may further include a pump 550 configured to supply the water in the storage tank 500 to the two-fluid nozzle 380. The air bypassed from the outlet of the air compressor 200 and the water in the storage tank 500, which is suctioned by the pump 550, may be mixed with each other in an interior of the two-fluid nozzle 380, to form fluid. The mixed fluid may be ejected to a space of the inlet manifold 330. When the internal mixing two-fluid nozzle is used, an amount of the water supplied to the two-fluid nozzle 380 through the pump 550 may be easily adjusted in accordance with an amount of the air supplied to the two-fluid nozzle 380.

The water and the air ejected to the space of the inlet manifold 330 by the two-fluid nozzle 380 may be mixed with each other to form fluid supplied to the plurality of tubes 360.

The formed fluid may sequentially pass through the inlet manifold 330, the plurality of tubes 360 and the outlet manifold 370. The water may be evaporated in the inlet manifold 330 by high pressure and high temperature. Further, in the space of the inlet manifold 330, the temperature of the air is lowered or a flow rate of the air is lacked, so that relative humidity may easily arrive at 100%. Thus, all the water may not be evaporated. That is, the compressed air, the water, and vapor formed by evaporating the water may exist in the space of the inlet manifold 330. The air, the not-evaporated water and the vapor may flow to the plurality of tubes 360.

The fluid flowing to the plurality of tubes 360 and the air passing through the inner space 355 of the body 350 are heat exchanged with each other, so that the water in the fluid may be evaporated and the air passing through the inner space 355 may be cooled. In this case, for more effective heat exchange, micro-holes 366 passing through the hollows 365 of the tubes 360 may be formed in the plurality of tubes 360. The micro-holes 366 may have the size at which water cannot pass through the micro-holes 366 but air can pass through the micro-holes 366 and may be formed of a material at which water cannot pass through the micro-holes 366 but air can pass through the micro-holes 366. A portion of the air passing through the inner space 355 of the body 350 may be introduced into the hollows 365 of the plurality of tubes 360 through the micro-holes 366. The introduced air may heat fluid in the hollow hole 365 to evaporate the water not evaporated in the inlet manifold 330.

In this case, the total enthalpy of the air supplied from the outlet of the air compressor 200 to the two-fluid nozzle 380 and the air introduced into the hollows 365 of the tubes 360 through the micro-holes 366 needs to be controlled to be larger than or at least equal to latent heat of the water suctioned to the two-fluid nozzle 380. That is, all the water suctioned to the two-fluid nozzle 380 may be controlled to be evaporated inside the inlet manifold 330 and the hollows 365 of the plurality of tubes 360. When the water is introduced into the inlet of the air compressor 200, a problem that compressors blades are damaged may occur.

Meanwhile, factors that may control the total enthalpy of the air and the total latent heat of the water include the size and the number of the micro holes 366, the number of the two-fluid nozzle 380 (amounts of the water and the air that are ejected), the ejecting location of the two-fluid nozzle 380, and the like. Through various experiments and measurements, it is preferred that the factors are properly adjusted such that the total enthalpy of the air supplied from the outlet of the air compressor 200 to the two-fluid nozzle 380 and the air introduced into the hollows 365 of the tubes 360 through the micro-holes 366 is not less than the latent heat of the water suctioned to the two-fluid nozzle 380.

For example, in connection with the number of the micro holes 366, the number of micro holes arranged to be adjacent to the air inlet 310 may be larger than the number of micro holes formed in the tubes arranged to be adjacent to the air outlet 390. Otherwise, in connection with the size of the micro holes 366, the size of micro holes arranged to be adjacent to the air inlet 310 may be larger than the size of micro holes formed in the tubes arranged to be adjacent to the air outlet 390. Because the air passing through the inner space 355 is heat-exchanged with the fluid as it goes from the air inlet 310 to the air outlet 390, the air having relatively higher temperature than that of the air outlet 390 may pass through the air inlet 310. Thus, it is preferred that a large amount of the air having high temperature be introduced into the hollows of the tubes arranged to be adjacent to the air inlet 310.

In this case, the two-fluid nozzle 380 is provided on one side of the inlet manifold 330 to be adjacent to the air outlet 390, to eject the fluid in a direction that is opposite to a direction in which the air supplied through the air inlet 310 passes through the inner space 355. Due to the nature of the two-fluid nozzle 380, because the pressure of the fluid ejected from the two-fluid nozzle 380 is high, a large amount of the fluid may be introduced into the tubes located to be far from the two-fluid nozzle 380, that is, to be adjacent to the air inlet 310. The air having relatively high temperature is introduced into the hollows of the tubes through which a large amount of the fluid flows, so that heat exchange efficiency may be improved.

The water is evaporated while flowing through the inlet manifold 330 and the plurality of tubes 360, and the air and the vapor may be accommodated in the outlet manifold 370. Further, the body 350 may further include a fluid outlet 378 formed in the outlet manifold 370 to communicate with the inlet of the air compressor 200. Meanwhile, an internal volume of the outlet manifold 370 may be increased as it goes toward the fluid outlet 378. Thus, the air and the vapor that are far from the fluid outlet 378 may be easily diffused.

The fuel cell system may further include a recovery pipe 10 connected from the outlet manifold 370 to the inlet of the air compressor 200. The fluid (preferably, the air and the vapor) ejected by the two-fluid nozzle 380 may be supplied to the inlet of the air compressor 200 via the inlet manifold 330, the tubes 360, the outlet manifold 370 and the recovery pipe 10. Because the fluid includes the vapor, the air that is to be supplied to the air inlet 310 of the body 350 may be humidified when the fluid is supplied to the inlet of the air compressor 200 through the fluid outlet 378 and the recovery pipe 10. Thus, the air humidified in the inlet of the air compressor 200 and cooled in the inner space 355 of the body 350 may be supplied to the stack 400 of the fuel cell.

The air cooled and humidified using only the air conditioner 300 without using an air cooler and a humidifier may be supplied to the cathode.

The fuel cell system may further include an operation valve 15. The operation valve 15 may be provided in the recovery pipe 10 to open/close the recovery pipe 10. The operation of the two-fluid nozzle 380 may be determined according to opening/closing of the recovery pipe 10. That is, when the recovery pipe 10 is opened by opening the operation valve 15, the ejecting of the two-fluid nozzle 380 may be operated, and when the recovery pipe 10 is closed by closing the operation valve 15, the ejecting of the two-fluid nozzle 380 may be stopped.

This operation will be described in more detail with reference to FIG. 1. For convenience of understanding, the pressure of the outlet of the air compressor 200 is referred to as P1, the pressure of the space 355 of the inlet manifold 330 is referred to as P2, and the pressure of the space 375 of the outlet manifold 370 is referred to as P3.

First, when the recovery pipe 10 is opened by opening the operation valve 15, P1>P2>P3. Thus, the air may sequentially flow through the air compressor 200, the two-fluid nozzle 380, the inlet manifold 330, the inner space 355 of the body 350, the outlet manifold 370, and the recovery pipe 10. Thus, the compressed air is ejected from the two-fluid nozzle 380. Further, as described above, the water is pumped from the storage tank 500 to be suctioned to the two-fluid nozzle 380. That is, the two-fluid nozzle 380 may be operated and the air passing through the air conditioner 300 may be cooled and humidified.

When the recovery pipe 10 is closed by closing the operation valve 15, P1=P2=P3. Thus, the air may not sequentially flow through the outlet of the air compressor 200, the two-fluid nozzle 380, the inlet manifold 330, the inner space 355 of the body 350, the outlet manifold 370, and the recovery pipe 10. Thus, the two-fluid nozzle 380 may not be also operated and the air passing through the air conditioner 300 may not be cooled and humidified.

Here, the fuel cell system may further include a suction pipe 20 connected from the storage tank 500 to the two-fluid nozzle 380 and a check valve 25 provided in the suction pipe 20. The water suctioned from the storage tank 500 to the two-fluid nozzle 380 flows through the suction pipe 20. When the recovery pipe 10 is closed by the operation valve 15, the water may flow from the two-fluid nozzle 380 to the storage tank 500. The check valve 25 allows the water to flow only from the storage tank 500 to the two-fluid nozzle 380, so that the water may be prevented from being flowing backwards to the storage tank 500 even when the recovery pipe 10 is closed by closing the operation valve 15.

The fuel cell system may further include a control unit (not illustrated) configured to control the operation valve 15. The control unit may open the operation valve 15 when the temperature of the air at the outlet of the air compressor 200 is not less than a first reference temperature. The first reference temperature refers to a temperature that is experimentally identified to cause a problem in operation of a fuel cell when the air discharged to the outlet of the air compressor 200 is supplied to the cathode because the temperature of the air is too high. That is, the first reference temperature means a temperature of the air at the outlet of the air compressor 200, which is determined to be cooled by the air conditioner 300.

Further, the control unit may open the operation valve 15 when the temperature of the air supplied to the cathode is not less than a second reference temperature. The second reference temperature refers to a temperature that is experimentally identified to cause a problem in the stack 400 when the air is supplied to the cathode.

As a result, the control unit may make a control to close the operation valve 15 only when the temperature of the air at the outlet of the air compressor 200 is lower than the first reference temperature and the temperature of the air supplied to the cathode is lower than the second reference temperature.

The fuel cell system may include a first temperature measurement mechanism (not illustrated) configured to measure the temperature of the air at the outlet of the air compressor 200 and a second temperature measurement mechanism (not illustrated) configured to measure the temperature of the air supplied to the cathode.

Further, the control unit may open the operation valve 15 only when a water level of the storage tank 500 is not less than a reference water level. Even though the air supplied to the cathode is necessarily cooled and humidified, when a sufficient amount of the water is not stored in the storage tank 500, the air cannot be cooled and humidified even when the operation valve 15 is opened. Thus, the control unit may notify the storage tank 500 to fill water when the water is not stored in the storage tank 500 at the reference water level or more, and may make a control to open the operation valve 15 when the water is stored in the storage tank 500 at the reference water level or more.

In a condition in which the operation valve 15 is opened, the control unit may calculate a time period during which the operation valve 15 is opened, and may open the operation valve 15 during the time period. In more detail, a required cooling rate of the air supplied to the cathode may be calculated based on a difference between the temperature of the air at the outlet of the air compressor 200 and the temperature of the air supplied to the cathode, a difference between the temperature of the air at of the outlet of the air compressor 200 and the first reference temperature, a difference between the temperature of the air supplied to the cathode and the second reference temperature, and a flow rate of the air supplied to the air compressor 200. Further, the control unit may calculate for which time period the operation valve 15 to be opened to cool the air by the required cooling rate and may make a control to open the operation valve 15 for the calculated time period. Because unnecessary ejecting and cooling of the air mean loss of the compressed air, an optimum operation time period is calculated, so that an amount of the air circulating through the recovery pipe 10 may be minimized.

Figure 4:
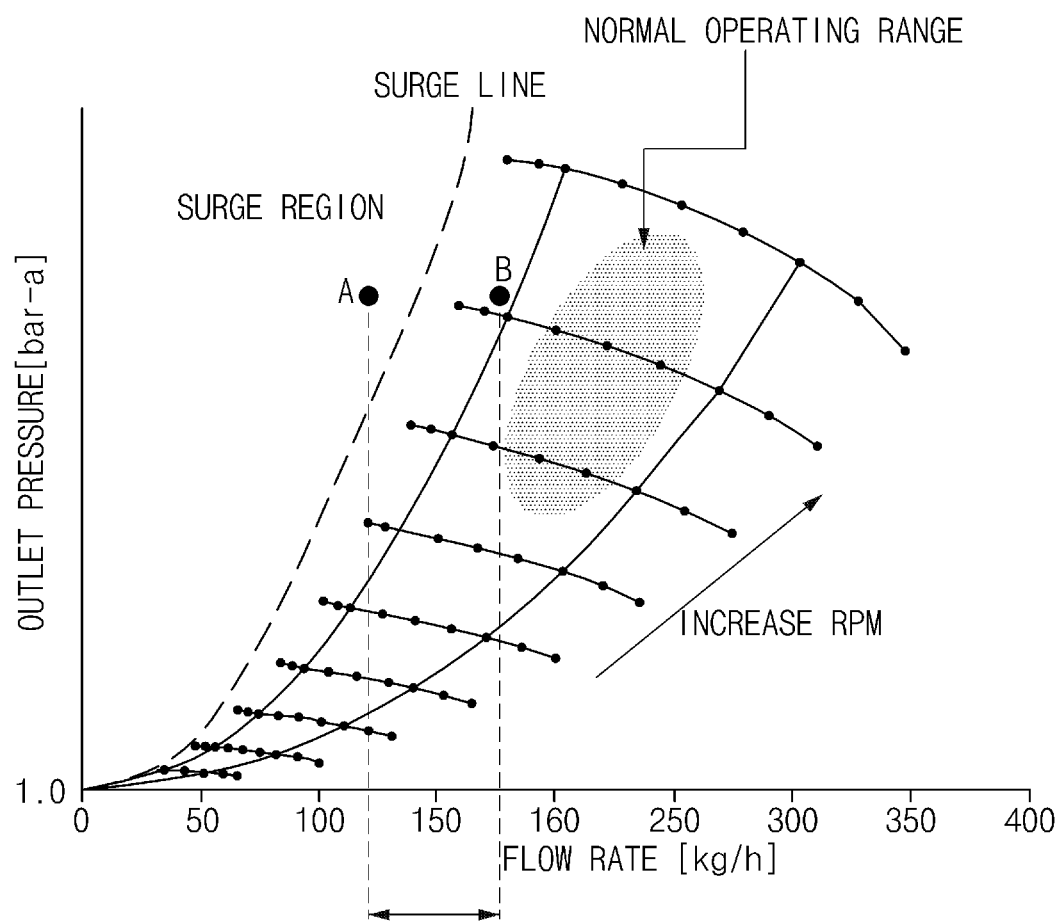
FIG. 4 is a graph depicting a surge curve for illustrating a relationship between a flow rate introduced into an inlet of the air conditioner and an outlet pressure.

FIG. 4 is a graph depicting a surge curve for illustrating a relationship between a flow rate introduced into an inlet of the air compressor 200 and an outlet pressure. A surge phenomenon refers to a phenomenon in which backward flow of the air occurs in the air compressor 200, and the surge curve means a curve representing a boundary condition in which the surge phenomenon is generated. In FIG. 4, an X axis denotes a flow rate of the air supplied to an inlet of the air compressor and a Y axis denotes an outlet pressure of the air compressor. In FIG. 4, a surge area (see point A) is located on a left side of a surge line. When a flow rate and a pressure have values corresponding to the surge area, the surge phenomenon may occur when the air compressor is operated.

Even when a user wants to operate the air compressor 200 such that the pressure at the outlet of the air compressor 200 of the fuel cell system according to the embodiment of the present disclosure has a high value corresponding to point A, if the flow rate is lacked, this state corresponds to the surge area, and thus it is impossible to normally operate the compressor. Thus, when it is required to increase the flow rate, but an operation condition of the air compressor 200 corresponds to a condition in which the surge phenomenon occurs, the control unit may open the operation valve 15 to increase the flow rate of the air supplied to the inlet of the air compressor 200. When the operation valve 15 is opened, and thus, the air recirculating through the recovery pipe 10 is introduced into the inlet of the air compressor 200, the flow rate of the air compressor 200 increases, and the air compressor 200 having a high compression rate may be operated at a normal condition (see point B) in which the surge phenomenon does not occur.

According to the present disclosure, air passing through an air conditioner may be cooled through heat exchange with fluid flowing through tubes, and the cooled air may be supplied to a cathode.

Further, according to the present disclosure, the fluid humidified while flowing through the tubes of the air conditioner recirculates to an inlet of an air compressor, so that the humidified air may be supplied to the cathode.

The above description is merely illustrative description of the technical spirit of the present disclosure, and various modifications and deformations may be derived by those skilled in the art to which the present disclosure pertains without departing from the essential feature of the present disclosure. Thus, the embodiments that are disclosed in the present disclosure are not for limiting but for describing the technical spirit of the present disclosure, and the scope of the technical spirit of the present disclosure is not limited by the embodiments. The protection scope of the present disclosure should be interpreted by the appended claims and all the technical spirit corresponding to the equivalents thereof should be interpreted to be included in the scope of a right of the present disclosure.

What is claimed is:

1. An air conditioner comprising:
   a body having an air inlet configured to receive air from an air compressor configured to pump the air to provide the air to a cathode of a fuel cell stack, an air outlet configured to supply the air to the cathode, and an inner space allowing the air inlet and the air outlet to communicate with each other; and
   a plurality of tubes disposed in the inner space of the body, wherein fluid flows along hollows of the tubes;
   wherein a plurality of micro holes are formed in the tubes to communicate with the hollows and through which air but not water passes;
   wherein a portion of the air passing through the inner space of the body is introduced to the hollows of the tubes through the micro holes to heat the fluid within the hollows to evaporate water in the fluid;
   wherein the air conditioner is configured so that while the air supplied through the air inlet passes through the inner space, the air is cooled through heat exchange with the fluid flowing along the hollows of the tubes; and
   wherein a number of the micro holes formed in the tubes arranged to be adjacent to the air inlet is larger than a number of the micro holes formed in the tubes arranged to be adjacent to the air outlet, or a size of the micro holes formed in the tubes arranged to be adjacent to the air inlet is larger than a size of the micro holes formed in the tubes arranged to be adjacent to the air outlet.

2. The air conditioner of claim 1, wherein the body includes:
   an inlet manifold formed on a side of the body, from which the fluid is supplied to the tubes, the inlet manifold communicating with the tubes to branch the fluid into the tubes and providing a space distinguished from the inner space; and an outlet manifold formed on a side of the body, to which the fluid is discharged from the tubes, the outlet manifold communicating with the tubes to accommodate the fluid discharged from the tubes and providing a space distinguished from the inner space.

3. The air conditioner of claim 2, further comprising a two-fluid nozzle provided on one side of the inlet manifold and configured to eject compressed air and water to the space of the inlet manifold by supplying the compressed air, wherein the compressed air and the water are mixed with each other in the space of the inlet manifold, to form the fluid.

4. The air conditioner of claim 3, wherein the body further includes a fluid outlet through which the fluid ejected from the two-fluid nozzle is supplied to an inlet of the air compressor, the fluid outlet formed in the outlet manifold to communicate with the inlet of the air compressor, so as to humidify the air that is to be supplied to the air inlet of the body.

5. The air conditioner of claim 3, wherein the two-fluid nozzle is provided on one side of the inlet manifold to be adjacent to the air outlet, and is configured to eject the fluid in a direction that is opposite to a direction in which the air supplied through the air inlet passes through the inner space.

6. The air conditioner of claim 2, wherein the body further includes a fluid outlet formed in the outlet manifold to communicate with an inlet of the air compressor, wherein an inner volume of the outlet manifold increases as it goes to the fluid outlet.

7. The air conditioner of claim 1, further comprising a plurality of separators provided in the inner space to be close to the air inlet, and configured to disperse the air supplied from the air compressor.

8. The air conditioner of claim 1, wherein the number of the micro holes formed in the tubes arranged to be adjacent to the air inlet is larger than the number of the micro holes formed in the tubes arranged to be adjacent to the air outlet.

9. The air conditioner of claim 1, wherein the size of the micro holes formed in the tubes arranged to be adjacent to the air inlet is larger than the size of the micro holes formed in the tubes arranged to be adjacent to the air outlet.

10. A fuel cell system comprising:
a fuel cell stack having an anode and a cathode;
an air compressor configured to pump air to supply the air to the cathode; and
an air conditioner having an air inlet to receive the air from an outlet of the air compressor and an air outlet to supply the air to the cathode, wherein the air conditioner comprises:
  a body having an inner space between the air inlet and the air outlet through which the air supplied from the outlet of the air compressor can pass; and
  a plurality of tubes provided in the inner space of the body and through which fluid flows along hollows inside the tubes;
  wherein a plurality of micro holes which formed in the tubes to communicate with the hollows and through which air but not water passes;
  wherein a portion of the air passing through the inner space of the body is introduced to the hollows of the tubes through the micro holes to heat the fluid within the hollows to evaporate water in the fluid;
  wherein the air conditioner is configured so that while passing through the inner space, the air supplied from the outlet of the air compressor to the air conditioner is cooled through heat exchange with the fluid flowing along the hollows of the tubes; and
  wherein a number of the micro holes formed in the tubes arranged to be adjacent to the air inlet is larger than a number of the micro holes formed in the tubes arranged to be adjacent to the air outlet, or a size of the micro holes formed in the tubes arranged to be adjacent to the air inlet is larger than a size of the micro holes formed in the tubes arranged to be adjacent to the air outlet.

11. The fuel cell system of claim 10, wherein the body includes:
an inlet manifold formed on a side of the body, from which the fluid is supplied to the tubes, the inlet manifold providing a space communicating with the tubes to branch the fluid into the tubes; and
an outlet manifold formed on a side of the body, to which the fluid is discharged from the tubes, the outlet manifold providing a space communicating with the tubes to accommodate the fluid discharged from the tubes.

12. The fuel cell system of claim 11, further comprising a two-fluid nozzle provided on one side of the inlet manifold and configured to eject, to the space of the inlet manifold, the fluid formed by mixing the air bypassed from the outlet of the air compressor and water suctioned from a storage tank in which the water is stored with each other in an interior thereof, wherein the fluid ejected from the two-fluid nozzle sequentially passes through the inlet manifold, the tubes, and the outlet manifold.

13. The fuel cell system of claim 11, further comprising a two-fluid nozzle provided on one side of the inlet manifold and configured to suction water from a storage tank in which the water is stored, by supplying the air bypassed from the outlet of the air compressor, and to eject the air and the water to the space of the inlet manifold, wherein the fluid formed by mixing the air and the water ejected from the two-fluid nozzle with each other in the space of the inlet manifold sequentially passes through the inlet manifold, the tubes, and the outlet manifold.

14. The fuel cell system of claim 13, further comprising a recovery pipe through which the fluid ejected from the two-fluid nozzle is supplied to the inlet of the air compressor via the inlet manifold, the tubes, and the outlet manifold, the recovery pipe connected from the outlet manifold to the inlet of the air compressor to humidify the air that is to be supplied to the cathode.

15. The fuel cell system of claim 14, further comprising an operation valve provided in the recovery pipe to open/close the recovery pipe, and configured to determine an operation of the two-fluid nozzle according to the opening/closing the recovery pipe.

16. The fuel cell system of claim 15, further comprising a suction pipe connected from storage tank to the two-fluid nozzle such that the water is suctioned from the storage tank to the two-fluid nozzle, wherein the storage tank recovers and stores water in exhaust gas discharged from the cathode.

17. The fuel cell system of claim 16, further comprising a check valve provided in the suction pipe to prevent the water from flowing from the two-fluid nozzle to the storage tank when the recovery pipe is closed by the operation valve.

18. The fuel cell system of claim 15, further comprising a control unit configured to control the operation valve, wherein the control unit is configured to open the operation valve to cool the air with the air conditioner, when the temperature of the air at the outlet of the air compressor is not less than a first reference temperature or the temperature of the air supplied to the cathode is not less than a second reference temperature.

19. The fuel cell system of claim 18, wherein the control unit is configured to calculate a required cooling rate of the air supplied to the cathode based on a difference between the temperature of the air at the outlet of the air compressor and the temperature of the air supplied to the cathode and a flow rate of the air supplied to the air compressor, and into control an opening time period of the operation valve based on the calculated required cooling rate.

20. The fuel cell system of claim 18, wherein the control unit is configured to open the operation valve when an operation condition of the air compressor corresponds to a condition in which a surge phenomenon occurs, in a relationship between a flow rate of the air introduced into the inlet of the air compressor and an outlet pressure of the air compressor.

\* \* \* \* \*